April 16, 1968 D. W. HOLDSWORTH 3,377,850
POWER METER
Filed Dec. 6, 1965
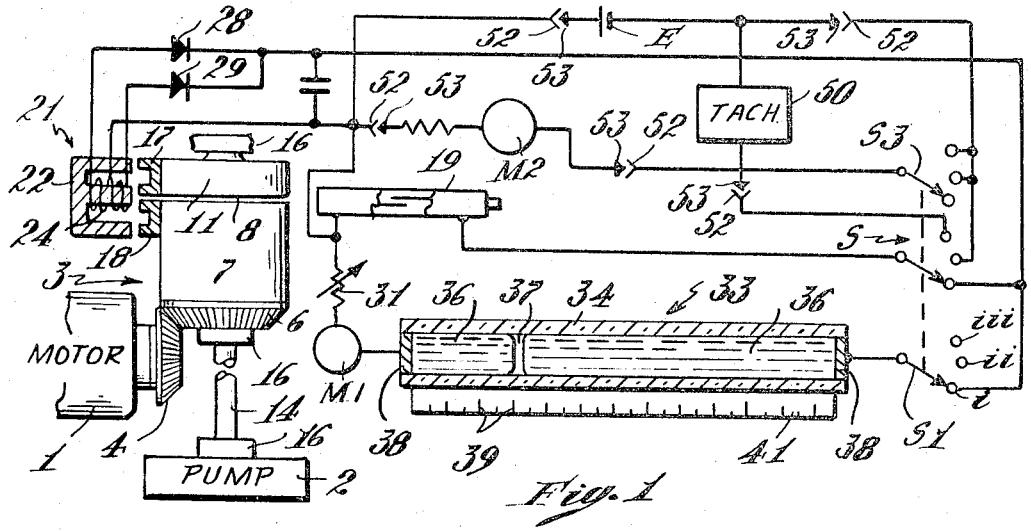
Fig. 1
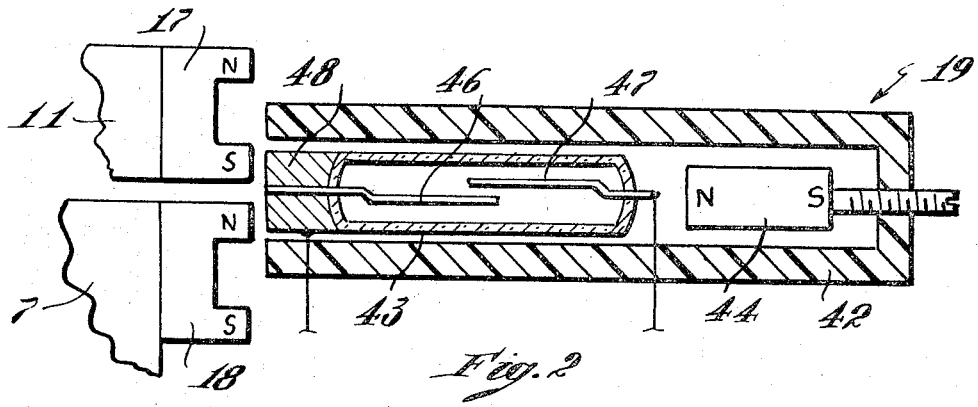
Fig. 2
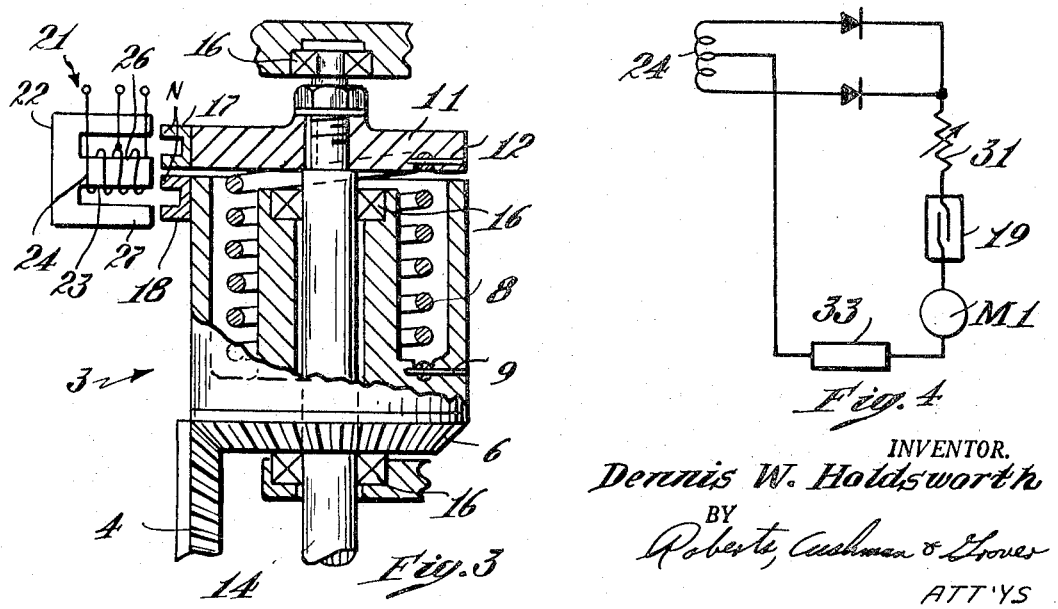
Fig. 3
Fig. 4
INVENTOR.
Dennis W. Holdsworth
BY
Roberts, Cushman & Grover
ATT'YS

United States Patent Office 3,377,850
Patented Apr. 16, 1968

3,377,850
POWER METER
Dennis W. Holdsworth, Lincoln, Mass., assignor to Comstock & Wescott, Inc., Cambridge, Mass., a corporation of Massachusetts
Filed Dec. 6, 1965, Ser. No. 511,789
13 Claims. (Cl. 73—138)

This invention relates to the measurement of mechanical power, such as the instantaneous or time integrated horsepower delivered by an engine or motor to a mechanical load, and particularly to simplified power metering apparatus of reduced cost for use in small installations.

For example, the rental income from gas engine power irrigation pumps of relatively small size and cost does not justify costly metering instrumentation. In fact, the cost of power meters hitherto available has been a substantial deterrent to wide spread rental of gas driven pumps.

Nevertheless a power meter for such pumps must accurately measure the power consumed over a period of months for billing purposes.

It is the object of the present invention to provide inexpensive apparatus for metering power consumed by rotating machinery such as a pump, which is rugged and reliable over long periods in the field and which is easily tested and maintained.

According to the invention apparatus for measuring the mechanical power delivered by a drive system to a mechanical load comprises a first rotating member having means for coupling the first member to a drive system, a second rotating member having means for coupling the second member to a mechanical load, a torsion spring rotatively coupling said first and second members so as to permit angular displacement between the members proportional to torque transmitted through the spring, an electrical coulometric circuit, magnetic means on at least one of said rotating members, inductive means in said circuit disposed to be responsive to rotation of said magnetic means to produce an electric current in said circuit proportional to the rotational speed of said members and switch means disposed to be responsive to said magnetic means thereby to control the time of flow of said current in said circuit in proportion to the angular displacement of said members, whereby said circuit continuously measures power as the product of the speed of said rotating members and their torque displacement.

For the purpose of illustration typical embodiments of the invention are shown in the accompanying drawing in which FIG. 1 shows schematically a coupling and circuit for measuring power delivered by a motor coupled to a pump;

FIG. 2 is an enlarged view of a part of the circuit of FIG. 1;

FIG. 3 is an enlarged section of the coupling of FIG. 1; and

FIG. 4 is a modified form of the circuit of FIG. 1.

As shown in FIGS. 1 and 3 a motor 1 is connected to a pump 2 by a coupling 3. The coupling comprises a bevel gear 4 on the motor shaft meshed with a bevel gear 6 on a cylindrical housing 7. A heavy helical spring 8 is positioned by the housing 7 and anchored to the housing at one end by a set screw 9. The other end of the spring 8 is anchored to a circular plate 11 by a set screw 12, so that the spring flexibly connects the coupling housing 7 and plate 11. Depending from the plate 11 is a shaft 14 connected to the pump 2. Bearings 16 rotatively support the housing 7, plate 11 and shaft 14.

Mounted at adjoining points of the peripheries of the housing 7 and plate 11 are two horseshoe magnets 17 and 18 with north and south poles N and S directed radially of the housing and plate. When the motor and pump are at rest the two magnets are on parallel radii. As the motor drives the pump through the coupling the housing and plate are allowed angular displacement by the spring 8 in proportion to the torque transmitted through the spring. The magnets will be correspondingly displaced.

Adjacent the rotary path of the magnets is a magnetic reed switch 19 and an inductive power pickup 21 comprising a highly permeable E-shaped iron core 22 on the central leg 23 of which is wound a center tapped coil 24. The central leg 23 of the core is closely opposed to the path of the south pole S of the plate magnet 17 and the north pole N of the housing magnet 18. The upper leg 26 of the core is opposite the north pole N of the plate magnet 17, while the lower core leg 27 is opposite the south pole S of the housing magnet. Thus, as the angularly displaced magnets are rotated by the pickup 21 alternating cycles of electric current are induced in the pickup coil 24.

The pickup coil 24 is connected in an electrical coulometric circuit including diodes 28 and 29 which rectify the alternating current and supply direct current through a variable resistor 31, a microammeter M1 and a coulometer 33, returning to the center tap of the pickup coil 24. The coulometric circuit also includes the magnetic reed switch 19 which, in FIG. 1, is in parallel with the microammeter M1 and coulometer 33. Exemplary specifications for the microammeter are 0 to 15 microamperes, 1960 ohms resistance, and 100 kilohms for the resistor 31. The microammeter M1 indicates the instantaneous current flowing in the circuit, which in turn is dependent on the instantaneous rotational speed of the coupling 3 and the torque transmitted, i.e., instantaneous brake horsepower.

The coulometric circuit is completed by a switch S having three wipers S1, S2 and S3 each transferable through three positions between three corresponding contacts *i*, *ii* and *iii*. In normal operation the wipers are in position *i* connecting the reed switch 19 in parallel with the series-connected resistance 31, meter M1 and coulometer 33.

The coulometer 33 comprises a glass or other insulative capillary tube 34 holding a column of mercury 36 divided into two volumes by a small wall of electrolyte 37 such as a mercuric iodide solution. At each end of the column are conductive electrode plugs 38 for connecting the mercury and electrolyte column in the coulometric circuit. Passage of the rectified current from right to left through the tube causes a transfer of mercury from the right volume through the electrolyte to the left volume according to Faraday's electrolytic effect in proportion to the current. Consequently the wall 37 of electrolyte progresses to the right and serves as an indicator with respect to graduations 39 on a scale 41 of time integrated horsepower.

However, the time during which current flows through the microammeter M1 and the coulometer 33 is controlled by the magnetic reed switch 19. As shown in FIG. 2 this switch comprises a non-magnetic case 42 in which are mounted an insulative switch capsule 43 and a bias magnet 44. Mounted in the capsule are two magnetic reed contacts 46 and 47, held open by their resilience in the absence of a magnetic field. Outside the capsule the left contact 46 is embedded in a soft iron shoe 48 secured to the end of the capsule. The shoe serves to concentrate flux from the magnet 44 in the magnetic contacts 46 and 47. The magnet 44 is adjusted toward or away from the contacts and shoe to a position where the flux is just sufficient to magnetize the contacts and hold them closed against their resiliency and short circuit the microammeter and coulometer. As the plate magnet 17 and housing magnet 18 on the rotating coupling are swept by the shoe 48 the field of the bias magnet is opposed or reinforced. As shown in FIG. 2 the bias magnet and housing magnet are so oriented that flux of the housing magnet opposes the bias flux and causes the switch contacts to open, thus allowing rectified current to flow through the microammeter and coulometer. Because the plate 11 is loaded by the pump, the housing magnet 18 will lead the plate magnet 17 past the shoe 44 and open the contacts 46 and 47 for a time interval dependent on the rotational speed of the coupling and the angular displacement of the magnets 17 and 18, the displacement being determined by the torque transmitted through the coupling. After this interval the plate magnet 17 will present its south pole S to the shoe 48 reinforcing the bias magnet field and closing the contacts for the remaining major portion of the revolution of the coupling.

During each interval in which the contacts are open, the current generated by the pickup 21 and rectified flows at a rate indicated by deflection of the microammeter. And, as operating time elapses, the current causes the electrolytic wall 37 to progress along the scale 41 indicating time integrated power consumption in horsepower-hours. By opening the contacts 46 and 47 only during a minor portion of each revolution, and by suitably selecting the length of the mercury and electrolyte column, several months of power consumption may be recorded between readings for billing purposes. The coulometer may then be reset by applying reverse current.

The coulometric circuit may be modified as shown in FIG. 4. Herein the circuit comprises the same components as in FIG. 1, but the reed switch 19 is connected in series with the microammeter 32 and coulometer 33. The polarity of the bias magnet with respect to the plate magnet and housing magnet is reversed such that the contacts of the switch are normally open, and are closed by the housing magnet for a minor interval in each coupling revolution, then opened by the plate magnet.

As shown in FIG. 1 the coulometric circuit is particularly easily adapted for testing with a battery E, a tachometer 50 and a resistor 51 and microammeter M2 like resistor 31 and meter M1 normally in circuit. It will be understood that the test components may be permanently connected or inserted in circuit at the time of testing by means of separable connectors 52 and 53. Similarly the switch S may be connected at the time of test although shown permanently connected in the coulometric circuit.

For testing the switch S is transferred from the normal operating position *i* to position *ii* to measure transmitted torque, and to position *iii* to measure instantaneous current. The product of the current and torque is the correct instantaneous brake horsepower. If, on returning the test switch S to position *i*, the meter M1 does not indicate the same value, the variable resistance 31 is adjusted to produce the correct reading. Thus the coulometric circuit is very conveniently calibrated and tested at the time of installation or of meter reading.

It should be understood that the present disclosure is for the purpose of illustration only and that this invention includes all modifications and equivalents which fall within the scope of the appended claims. For example, in place of the reed switch, an inductively triggered semiconductor, electronic valve or relay may be used.

I claim:

1. Apparatus for measuring the mechanical power delivered by a drive system to a mechanical load comprising a first rotating member adapted to be coupled to said drive system, a second rotating member adapted to be coupled to said mechanical load, a torsion spring rotatively coupling said first and second members so as to permit angular displacement between the members proportional to torque transmitted through the spring, an electrical coulometric circuit, magnetic means on both of said rotating members, inductive means connected to said circuit and disposed to be responsive to rotation of said magnetic means to produce an electric current in said circuit proportional to the rotational speed of said members, means to rectify said current, and switch means disposed to be responsive to said magnetic means and connected to said circuit to control the time of flow of said current in said circuit in proportion to the angular displacement of said members, means in said circuit responsive to operation of said inductive means and switch means for indicating the amount of current flowing therethrough, said switch means being connected to connect and disconnect said indicating means from said circuit, whereby said circuit measures the power transmitted by said coupling as the product of the speed of said rotating members and their torque displacement.

2. Apparatus according to claim 1 wherein said circuit comprises a time integrating coulometer connected in parallel with said switch means.

3. Apparatus according to claim 1 wherein said circuit comprises a time integrating coulometer in series with said switch means.

4. Apparatus according to claim 1 wherein said circuit comprises an ammeter connected in parallel with said switch means to indicate instantaneous power.

5. Apparatus according to claim 1 wherein said circuit comprises an ammeter connected in series with said switch means to indicate instantaneous power.

6. Apparatus according to claim 1 wherein said magnetic means comprises at least one permanent magnet disposed on one of said rotating members, and said inductive means comprises a magnetic core adjacent the rotary path of said magnet forming a magnetic path between the poles of said magnet and a coil around the core, whereby current is induced in said coil by passage of the magnet by said core dependent on the speed of the rotating member.

7. Apparatus according to claim 1 wherein said magnetic means comprises two permanent magnets respectively disposed on said rotating members, and said inductive means comprises a magnetic core adjacent the rotary paths of said magnets and forming two magnetic paths between the poles of said magnets and a coil on a part of said core common to both paths, whereby current is induced in said core by passage of the magnets thereby dependent on the speed of said rotating members.

8. Apparatus according to claim 7 wherein said magnetic means comprises two permanent magnets respectively disposed on said rotating members, said angular displacement of said members causing angular displacement of said magnets, and said switch means comprises a magnetic switch disposed adjacent the rotary paths of said magnets so as to open in response to one magnet and to close in response to the other magnet at intervals depending on the angular displacement of the magnets, whereby current is supplied to said coulometric circuit during intervals whose length is dependent on the torque displacement of the rotating members.

9. Apparatus according to claim 1 wherein said magnetic means comprises two permanent magnets respectively disposed on said rotating members, said angular displacement of said members causing angular displacement of said magnets, and said switch means comprises a magnetic switch disposed adjacent the rotary paths of said magnets so as to open in response to one magnet and to close in response to the other magnet at intervals depending on the angular displacement of the magnets, whereby current is supplied to said coulometric circuit during intervals whose length is dependent on the torque displacement of the rotating members.

10. Apparatus according to claim 1 characterized by a battery, a tachometer, and switching means for disconnecting said coulometric circuit from said switch means and connecting said battery and tachometer to said switch means.

11. Apparatus according to claim 1 further characterized by a self-integrating direct current meter and switching means for disconnecting said coulometric circuit from said switch means and connecting said direct current meter to said switch means.

12. Apparatus for measuring the mechanical power delivered by a drive system to a mechanical load comprising a first rotating member adapted to be coupled to said drive system; a second rotating member adapted to be coupled to said load; a torsion spring rotatively coupling said first and second members so as to permit angular displacement between the members proportional to torque transmitted through the spring; two permanent magnets respectively disposed on the periphery of said rotating members with their poles directed radially of the members, said angular displacement of said members causing a corresponding angular displacement of said magnets; a magnetic core adjacent the rotary paths of said magnets, said core having three legs, two legs being respectively disposed opposite a first set of unlike poles of said magnets and the third leg being disposed opposite a second set of unlike poles of both magnets, a coil wound around said third leg, said core forming two magnetic flux paths respectively between the poles of said magnets, said third leg being common to said two paths, whereby passage of said magnets past said core induces alternating current pulses in said coil; full wave rectifying means for converting said alternating current to direct current; a coulometric circuit; reed switch means comprising a magnetically responsive switch disposed adjacent the rotary paths of said second set of unlike magnet poles, said switch being responsive to passage of one of said second set of poles to transfer to open condition and responsive to the other of said second set of poles to transfer to closed positions at intervals depending on the angular displacement of the magnets; said reed switch means being connected to said coil and coulometric circuit to supply current from said coil to said circuit at said intervals; whereby said direct current is generated dependent on the rotational speed of said rotary members and transmitted to said coulometric circuit dependent on the torque displacement of said rotary members and therefore in proportion to the power transmitted.

13. Apparatus according to claim 12 wherein said coulometric circuit comprises a variable resistance, an instantaneous power meter and a coulometer, and characterized by a series connected battery and tachometer, a self-integrating ammeter, and switching means, said switching means having a first position in which the instantaneous power meter is connected to the aforesaid reed switch means, a second position in which only said battery and tachometer are connected to said reed switch means to measure the speed of said rotating members, and a third position in which only said self-integrating ammeter is connected through said reed switch means to said coil thereby to measure torque dependent current generated by said coil, whereby the product of said tachometer and self-integrating ammeter measurements can be compared with the measurement of the instantaneous power meter and said variable resistance adjusted to cause correct current flow in said coulometric circuit.

References Cited

UNITED STATES PATENTS 2,306,361 12/1942 Stuart _____ 73—136 X
3,045,478 7/1962 Dinlocker _____ 73—136

RICHARD C. QUEISSER, *Primary Examiner.*

J. W. MYRACLE, *Assistant Examiner.*